United States Patent
Noda (10) Patent No.: US 7,031,403 B2
(45) Date of Patent: Apr. 18, 2006

(54) PHASE SHIFT KEYING MODULATION INCLUDING A DATA CONVERTER FOR CONVERTING AN INPUT DATA SIGNAL HAVING 3 BITS LONG INTO TWO TERNARY CONVERTED DATA SIGNALS

(75) Inventor: Seiichi Noda, Tokyo (JP)

(73) Assignee: NEC Corporation, Tokyo (JP)

( * ) Notice: Subject to any disclaimer, the term of this patent is extended or adjusted under 35 U.S.C. 154(b) by 756 days.

(21) Appl. No.: 10/219,299

(22) Filed: Aug. 16, 2002

(65) Prior Publication Data
US 2003/0035496 A1 Feb. 20, 2003

(30) Foreign Application Priority Data
Aug. 16, 2001 (JP) ............................. 2001-247360

(51) Int. Cl.
H04L 27/20 (2006.01)
H03D 3/22 (2006.01)

(52) U.S. Cl. ...................................... 375/308; 375/329
(58) Field of Classification Search ................ 375/308, 375/329, 279; 370/335; 331/103; 329/304
See application file for complete search history.

(56) References Cited

U.S. PATENT DOCUMENTS 5,402,272 A * 3/1995 Nakatsu et al. ............... 360/39
5,438,592 A * 8/1995 Boccuzzi ..................... 375/283
6,239,666 B1   5/2001 Omori

FOREIGN PATENT DOCUMENTS

| DE | 32 45 885 A1 | 6/1984 |
| GB | 1 539 389 | 1/1979 |
| GB | 2 183 971 A | 6/1987 |
| JP | 53-147454 | 12/1978 |
| JP | A 55-159661 | 12/1980 |
| JP | 4-196943 | 7/1992 |
| JP | A 4-196945 | 7/1992 |
| JP | A 4-196946 | 7/1992 |
| JP | 2003-60724 | 2/2003 |

OTHER PUBLICATIONS

Yoichi Saito, *Modulation/Demodulation for Digital Radio Communications*, Institute of Electronics, Information and Communication Engineers of Japan, 1996, pp. 20-258.

* cited by examiner

Primary Examiner—Khai Tran
(74) Attorney, Agent, or Firm—Young & Thompson (57) ABSTRACT

In a phase modulation apparatus for modulating a phase of a carrier signal by an input signal to produce a phase-shift-keying-modulated wave, a data converter converts an input data signal having 3 bits long as the input signal into first and second ternary converted data signals. A ternary phase shift keying modulator modulates, in synchronism with a clock signal, the phase of the carrier signal by the first and the second ternary converted data signals to produce, as the phase-shift-keying-modulated wave, first and second ternary phase shift keying modulated signals, respectively. Disposed between the data converter and the ternary phase shift keying modulator, a parallel-serial converter temporally multiplexes the first and the second ternary converted data signals into first and second multiplexed signals, respectively. The parallel-serial converter supplies the ternary phase shift keying modulator with the first and the second multiplexed signals.

33 Claims, 8 Drawing Sheets

| INPUT | OUTPUT |
|-------|--------|
| 000   | 00     |
| 001   | 01     |
| 010   | 02     |
| 011   | 10     |
| 100   | 11     |
| 101   | 12     |
| 110   | 20     |
| 111   | 21     |

FIG. 8A
INPUT SIGNAL : 000
MODULATED WAVE : (0,0)

FIG. 8B
INPUT SIGNAL : 001
MODULATED WAVE : (0,1)

FIG. 8C
INPUT SIGNAL : 010
MODULATED WAVE : (0,2)

FIG. 8D
INPUT SIGNAL : 011
MODULATED WAVE : (1,0)

FIG. 8E
INPUT SIGNAL : 100
MODULATED WAVE : (1,1)

FIG. 8F
INPUT SIGNAL : 101
MODULATED WAVE : (1,2)

FIG. 8G
INPUT SIGNAL : 110
MODULATED WAVE : (2,0)

FIG. 8H
INPUT SIGNAL : 111
MODULATED WAVE : (2,1)

PHASE SHIFT KEYING MODULATION INCLUDING A DATA CONVERTER FOR CONVERTING AN INPUT DATA SIGNAL HAVING 3 BITS LONG INTO TWO TERNARY CONVERTED DATA SIGNALS

BACKGROUND OF THE INVENTION

This invention relates to phase shift keying modulation and, in particular, to a phase shift keying modulation apparatus, a phase shift keying modulation method, and a phase shift keying modulation program for carrying out conversion of three binary signals by the phase shift keying modulation.

As well known in the art, phase shift keying modulation is used in satellite communication, digital microwave communication, and so on. In general, a $2^n$-phase shift keying modulation such as a binary phase shift keying modulation, a quadrature phase shift keying modulation, an eight-phase shift keying modulation, and so on is used due to simplicity in a circuit where n represents a positive integer.

In a prior art of the phase shift keying modulation, the $2^n$-phase shift keying modulation is generally used in the manner which is described, for example, by Yoichi Saito in a book which is published by Denshi-Joho-Tsushin-Gakkai (the Institute of Electronics, Information and Communication Engineers of Japan) (February 1996) and which has a title "Modulation/Demodulation for digital radio communications." It will be assumed that binary data is transmitted at a bit rate of Rbps (bit per second). When the positive integer n is equal to one, namely, n=1, the binary phase shift keying modulation is used to transmit the binary data using a bandwidth corresponding to R Hz. When the positive integer n is equal to two, namely, n=2, the quadrature phase shift keying modulation is used to transmit the binary data using a bandwidth corresponding to R/2 Hz.

Attention will be directed to a conventional phase shift keying modulation. It will be described in a case where phase shift keying modulation in subjected to a binary digital signal having n bits long or n bit-string. In this event, the phase shift keying modulation is carried out so as to make the binary digital signal correspond to signal points of $2^n$ values.

The above-mentioned prior art has problems as follows.

In the $2^n$-phase shift keying modulation as the conventional art of the phase shift keying modulation, it in impossible to flexibly set a frequency because an interval between frequencies enable to modulate is widely apart (e.g. 50 megahertz (MHz), 100 MHz, 200 MHz, . . . , and so on).

For example, it will be assumed that an available bandwidth is equal to 80 MHz and the binary phase shift keying modulation and the quadrature phase shift keying modulation require bandwidths of 100 MHz and 200 MHz in connection of necessary transmission capacity. In this event, it is impossible to use the binary phase shift keying modulation because the binary phase shift keying modulation is the bandwidth of 100 MHz. The quadrature phase shift keying modulation is used. However, an available bandwidth remains largely because the quadrature phase shift keying modulation has the bandwidth of 50 Hz.

In addition, the quadrature phase shift keying modulation is advantageous in that transmission power is largely consumed. This is because, comparison with the binary phase shift keying modulation, the quadrature phase shift keying modulation requires the transmission power larger than that of the binary phase shift keying modulation by about 3 dB at a required C/N ratio (carrier-to-noise ratio) to realize an bit error rate equivalent to that of the binary phase shift keying modulation In recent years, demand for effective use of the frequency and of the transmission power becomes larger.

In the manner which is described above, a requirement is made as regards a phase shift keying modulation method intermediate between the quadrature phase shift keying modulation and the binary phase shift keying modulation that has a bandwidth between 100 MHz and 50 MHz and has a consumed power lower than that of the quadrature phase shift keying modulation.

In addition, various preceding arts related to the phase shift keying modulation of the type described are already known. By way of example, Japanese Unexamined Patent Publication of Tokkai No. Hei 4-196945 or JP-A 4-19645 describes "MULTILEVEL MODULATING/DEMODULATING COMMUNICATION METHOD AND SYSTEM" to effectively utilize a frequency by realizing a modulated frequency as a value dividing entire transmission capacity T with a value, which is not a natural number such as $5/2$, $7/3$ and $7/2$ or the like and utilizing an excess band by transmitting information as the combination of plural phase planes. According to JP-A 4-196945, in the case of N=2, M=4, P=1, Q=1, A1=24, and A2=24 of the N number (two) values A1 and A2, a transmitting data train conversion circuit converts a transmitted signal to 9 (M×N+P) trains of transmitting data train. A data conversion circuit converts the transmitting data train to the two pairs (N pairs) respectively having the 5 (M+Q) trains of transmitting parallel data trains. A parallel/serial conversion circuit converts the transmitting parallel data trains to 5 (M+Q) trains of transmitting serial data trains. A multilevel modulation circuit executes 24-value multilevel orthogonal modulation according to the 5 trains of the transmitting serial data trains to produce a modulated signal. From the modulated signal, a received signal is reproduced through a multilevel demodulation circuit, serial/parallel conversion circuit, inverse conversion circuit and data train number inverse conversion circuit. However, JP-A 4-196945 discloses technique well known in the art and merely discloses general structure although it directly relates to this invention.

In addition, Japanese Unexamined Patent Publication of Tokkai No. Hei 4-196946 or JP-A 4-196946 discloses "METHOD AND DEVICE FOR MULTILEVEL ORTHOGONAL AMPLITUDE MODULATION" to facilitate the acquisition of synchronism on the side of a demodulator while preventing the offset of a DC level at a base band signal by changing the arrangement of symbols on a phase plane and transmitting signals by using the combination of signal points rotationally symmetric for each 90 deg. on each phase plane. According to JP-A 4-196946, in the case of P=7 and N=2, a transmitting data train converted to seven data trains is inputted to a data train number and parallel/serial conversion circuit, converted to the two pairs of four parallel transmitting data trains and converted to a pair of four serial transmitting data trains later. A signal point combination change circuit changes the symbol arrangement of inputted signal points and outputs four serial data trains inputted to the modulation circuit. A multilevel modulation circuit executes the multilevel orthogonal amplitude modulation of 12 QAM to the four modulation circuit input serial data trains and outputs a modulated signal.

SUMMARY OF THE INVENTION

It is therefore an object of this invention to provide a phase shift keying modulation apparatus, a phase shift keying modulation method, and a phase shift keying modulation program each of which is capable of flexibly setting a frequency to be modulated.

It is another object of this invention to provide a phase shift keying modulation apparatus, a phase shift keying modulation method, and a phase shift keying modulation program each of which is capable or effectively processing modulation into a ternary phase signal.

Other objects of this invention will become clear as the description proceeds.

Attention will be directed to a case where the binary phase shift keying modulation requires the bandwidth of 100 MHz and the quadrature phase shift keying modulation requires the bandwidth of 50 MHz. In this event, it is possible to communicate using a bandwidth of about 67 MHz by using a ternary phase shift keying modulation according to this invention. Therefore, in comparison with a case of using the quadrature phase shift keying modulation, it is possible for the ternary phase shift keying modulation according to this invention to communicate at transmission power lower than about 1.3 dB in order to obtain a bit error rate equivalent to that in the quadrature phase shift keying modulation.

According to a first aspect of this invention, a phase shift keying modulation apparatus modulates a phase of a carrier signal by an input signal to produce a phase-shift-keying-modulated wave. The phase shift keying modulation apparatus comprises a data converter supplied with an input data signal having 3 bits long as the input signal The data converter converts the input data signal into first and second ternary converted data signals which are mapped on first and second phase planes, respectively. The first ternary converted data signal has one of first through third values. The second ternary converted data signal has one of the first through the third values when the first ternary converted data signal has either the first value or the second value. The second ternary converted data signal has either the first value or the second value when the first ternary converted data signal has the third value. A ternary phase shift keying modulator modulates, in synchronism with a clock signal, the phase of the carrier signal by the first and the second ternary converted data signals to produce, as the phase-shift-keying-modulated wave, first and second ternary phase shift keying modulated signals, respectively. The first ternary phase shift keying modulated signal on the first phase plane has one of first through third angles of the carrier signal that are predetermined in response to the first through the third values of the first ternary converted data signal, respectively. The second ternary phase shift keying modulated signal on the second phase plane has one of fourth through sixth angles of the carrier signal that are predetermined in response to the first through the third values of the second ternary converted data signal, respectively.

In the above-mentioned phase shift keying modulation apparatus according to the first aspect of this invention, the first value may be equal to a value of "0", the second value may be equal to a value of "1", and the third value may be equal to a value of "2". The first through the third angles may be different from one another by 120 degrees, and the fourth through the sixth angles may be different from one another by 120 degrees. The third and the sixth angles may be equivalent to or different from each other by 180 degrees. The first and the fourth angles maybe different from each other by 180 degrees, the second and the fifth angles may be different from each other by 180 degrees, and the third and the sixth angles may be different from each other by 180 degrees. The first angle may be equal to 0 degree, the second angle may be equal to 120 degrees, and the third angle may be equal to 240 degrees. The ternary phase shift keying modulator may produce the first and the second ternary phase shift keying modulated signals by renewing all angles of the first through the sixth angles into angles obtained by rotating the all angles in a predetermined direction by 120 degrees every modulation timing. The data converter may produce the first and the second converted data signals each using two parallel signals. In this event, the phase modulation apparatus further may comprise a parallel-serial converter, disposed between the data converter and the ternary phase shift keying modulator, for temporally multiplexing the first and the second ternary converted data signals into first and second multiplexed signals, respectively. The parallel-serial converter supplies the ternary phase shift keying modulator with the first and the second multiplexed signals each using a serial signal.

According to a second aspect of this invention, a method modulates a phase of a carrier signal by an input signal to produce a phase-shift-keying-modulated wave. The method comprises the steps of converting an input data signal having 3 bits long as the input signal into first and second ternary converted data signals which are mapped on first and second phase planes, respectively, the first ternary converted data signal having one of first through third values, the second ternary converted data signal having one of the first through the third values when the first ternary converted data signal has either the first value or the second value, the second ternary converted data signal having either the first value or the second value when the first ternary converted data signal has the third value, and of modulating, in synchronism with a clock signal, the phase of the carrier signal by the first and the second ternary converted data signals to produce, as the phase-shift-keying-modulated wave, first and second ternary phase shift keying modulated signals, respectively, the first ternary phase shift keying modulated signal on the first phase plane having one of first through third angles of the carrier signal that are predetermined in response to the first through the third values of the first ternary converted data signal, respectively, the second ternary phase shift keying modulated signal on the second phase plane having one of fourth through sixth angles of the carrier signal that are predetermined in response to the first through the third values of the second ternary converted data signal, respectively.

In the above-mentioned method according to the second aspect of this invention, the first value may be equal to a value of "0", the second value may be equal to a value of "1", and the third value may be equal to a value of "2". The first through the third angles may be different from one another by 120 degrees, and the fourth through the sixth angles may be different from one another by 120 degrees. The third and the sixth angles may be equivalent to or different from each other by 180 degrees. The first and the fourth angles may be different from each other by 180 degrees, the second and the fifth angles may be different from each other by 180 degrees, and the third and the sixth angles maybe different from each other by 180 degrees. The first angle may be equal to 0 degree, the second angle may be equal to 120 degrees, and the third angle may be equal to 240 degrees. The modulating step may produce the first and the second ternary phase shift keying modulated signals by renewing all angles of the first through the sixth angles into angles obtained by rotating the all angles in a predetermined direction by 120 degrees every modulation timing. The converting step may produce the first and the second converted data signals each using two parallel signals In this event, the method further may comprise the step of temporally multiplexing the first and the second ternary converted data signals into first and second multiplexed signals, respectively, to supply the modulating step with the first and the second multiplexed signals each using a serial signal.

According to a third aspect of this invention, a program makes a computer execute modulation of a phase of a carrier signal by an input signal to produce a phase-shift-keying-modulated wave. The program makes the computer convert an input data signal having 3 bits long as the input signal into first and second ternary converted data signals which are mapped on first and second phase planes, respectively, the first ternary converted data signal having one of first through third values, the second ternary converted data signal having one of the first through the third values when the first ternary converted data signal has either the first value or the second value, the second ternary converted data signal having either the first value or the second value when the first ternary converted data signal has the third value, and modulate, in synchronism with a clock signal, the phase of the carrier signal by the first and the second ternary converted data signals to produce, as the phase-shift-keying-modulated wave, first and second ternary phase shift keying modulated signals, respectively, the first ternary phase shift keying modulated signal on the first phase plane having one of first through third angles of the carrier signal that are predetermined in response to the first through the third values of the first ternary converted data signal, respectively, the second ternary phase shift keying modulated signal on the second phase plane having one of fourth through sixth angles of the carrier signal that are predetermined in response to the first through the third values of the second ternary converted data signal, respectively.

In the above-mentioned program according to the third aspect of this invention, the first value may be equal to a value of "0", the second value may be equal to a value of "1", and the third value may be equal to a value of "2". The first through the third angles may be different from one another by 120 degrees, and the fourth through the sixth angles may be different from one another by 120 degrees. The third and the sixth angles may be equivalent to or different from each other by 180 degrees. The first and the fourth angles may be different from each other by 180 degrees, the second and the fifth angles may be different from each other by 180 degrees, and the third and the sixth angles maybe different from each other by 180 degrees. The first angle may be equal to 0 degree, the second angle may be equal to 120 degrees, and the third angle may be equal to 240 degrees. The modulating execution may produce the first and the second ternary phase shift keying modulated signals by renewing all angles of the first through the sixth angles into angles obtained by rotating the all angles in a predetermined direction by 120 degrees every modulation timing. The converting execution may produce the first and the second converted data signals each using two parallel signals. In this event, the program further may make the computer temporally multiplex the first and the second ternary converted data signals into first and second multiplexed signals, respectively, to supply the modulating execution with the first and the second multiplexed signals each using a serial signal.

DESCRIPTION OF THE PREFERRED EMBODIMENTS

Figures 1A, 1B, 1C:
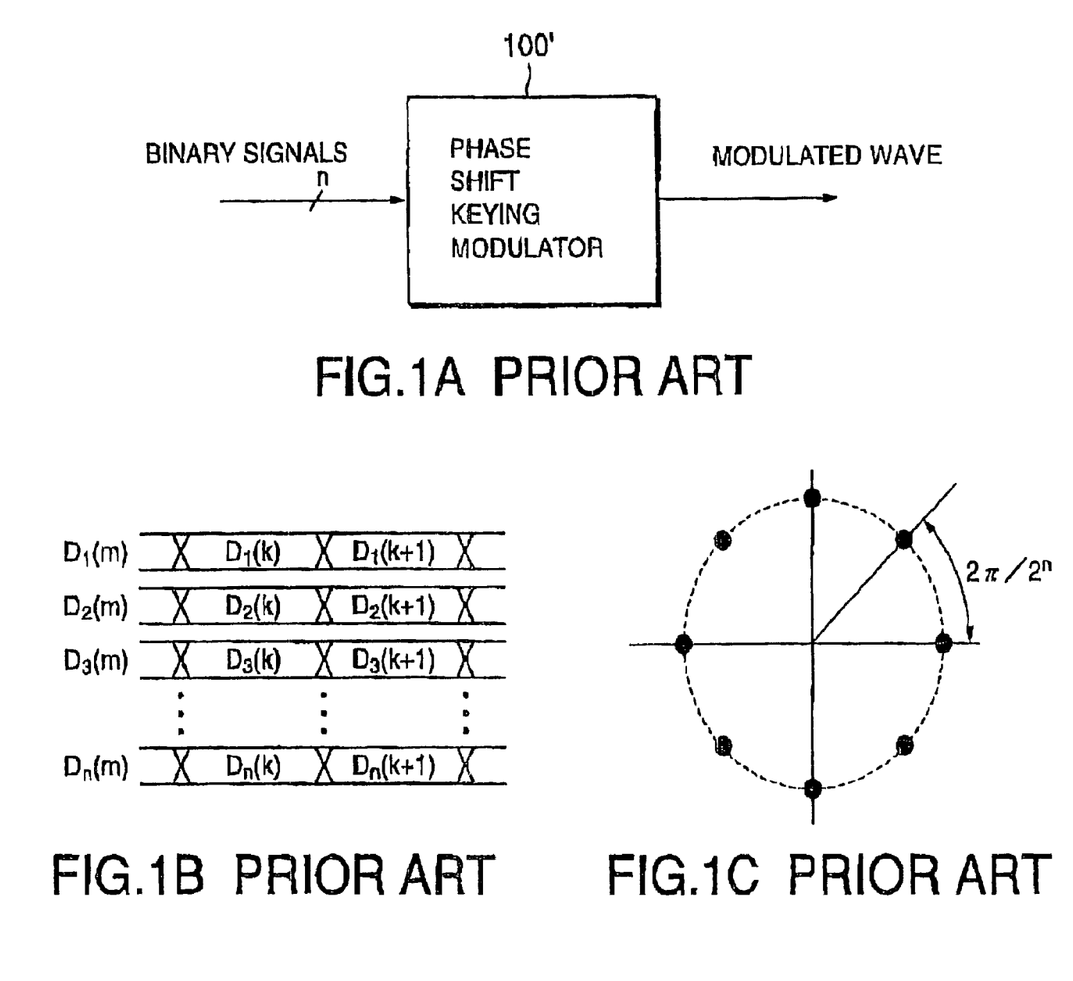
FIG. 1A is a block diagram showing a conventional phase shift keying modulator.
FIG. 1B shows first through n-th input data trains as n binary signals supplied to the phase modulator illustrated in FIG. 1A.
FIG. 1C shows a phase plane used in describing signal points of a phase-shift-keying-modulated signal produced by the phase modulator illustrated in FIG. 1A.

Referring to FIGS. 1A, 1B, and 1C, a conventional phase shift keying modulator 100' will be described at first in order to facilitate an understanding of the present invention. FIG. 1A is a block diagram showing the conventional phase shift keying modulator 100'. FIG. 1B shows first through n-th input data trains $D_1$ (m), $D_2$ (m), $D_3$ (m), ..., $D_n$ (m) as n binary signals supplied to the phase shift keying modulator 100' illustrated in FIG. 1A, where n represents a positive integer which is not less than two. FIG. 1C shows a phase plane used in describing signal points of a phase-shift-keying-modulated signal produced by the phase shift keying modulator 100' illustrated in FIG. 1A.

As shown in FIG. 1A, the phase shift keying modulator 100' is supplied with, as the n binary digital signal, the first through the n-th input data trains $D_1(m)$–$D_n(m)$ having n bits width (long) or n bits train. In other words, the first through the n-th input data trains $D_1(m)$–$D_n(m)$ are supplied to the phase shift keying modulator 100' in bit parallel.

Specifically, the first input data train $D_1(m)$ comprises a series of data elements such as $D_1(k)$, $D_1(k+1)$, and so on. The second input data train $D_2(m)$ comprises a series of data elements such as $D_2(k)$, $D_2(K+1)$, and so on. The third input data train $D_3(m)$ comprises a series of data elements such as $D_3(k)$, $D_3(k+1)$, and so on. The n-th input data train $D_n(m)$ comprises a series of data elements such as $D_n(k)$, $D_n(k+1)$, and so on.

The phase shift keying modulator 100' phase modulates a phase of a carrier signal by the first through the n-th input data trains $D_1(m)$–$D_n(m)$ to produce the phase-shift-keyingmodulated signal which is specified by $2^n$ signal points on the phase plane shown in FIG. 1C. The phase plane has an origin and real and imaginary axes orthogonally crossing at the origin. The $2^n$ signal points are in one-to-one correspondence to $2^n$ values. As shown in FIG. 1C, the $2^n$ signal points are arranged on a unit circle at regular intervals. In other words, adjacent two signal points are spaced at $2\pi/2^n$ or $360/2^n$ degrees as shown in FIG. 1C.

In the $2^n$-phase shift keying modulation, it is impossible to flexibly set a frequency because an interval between frequencies enable to modulate is widely apart. In addition, the quadrature phase shift keying modulation is disadvantageous in that transmission power is largely consumed. This is because, comparison with the binary phase shift keying modulation, the quadrature phase shift keying modulation requires the transmission power larger than that of the binary phase shift keying modulation by about 3 dB at a required C/N ratio (carrier-to-noise ratio) to realize a bit error rate equivalent to that of the binary phase shift keying modulation. In recent years, demand for effective use of the frequency and of the transmission power becomes larger.

In the manner which is described above, a requirement is made as regards a phase shift keying modulation method intermediate between the quadrature phase shift keying modulation and the binary phase shift keying modulation that has a bandwidth between 100 MHz and 50 MHz and has a consumed power lower than that of the quadrature phase shift keying modulation.

This invention is characterized by phase converting three binary signals (a signal having three bits long) into two ternary phase shift keying modulated signals using two parallel signals to produce the two ternary phase shift keying modulated signals. In addition, the two ternary phase shift keying modulated signals are reproduced into original three binary signals (the signal having three bits long).

Figure 2:
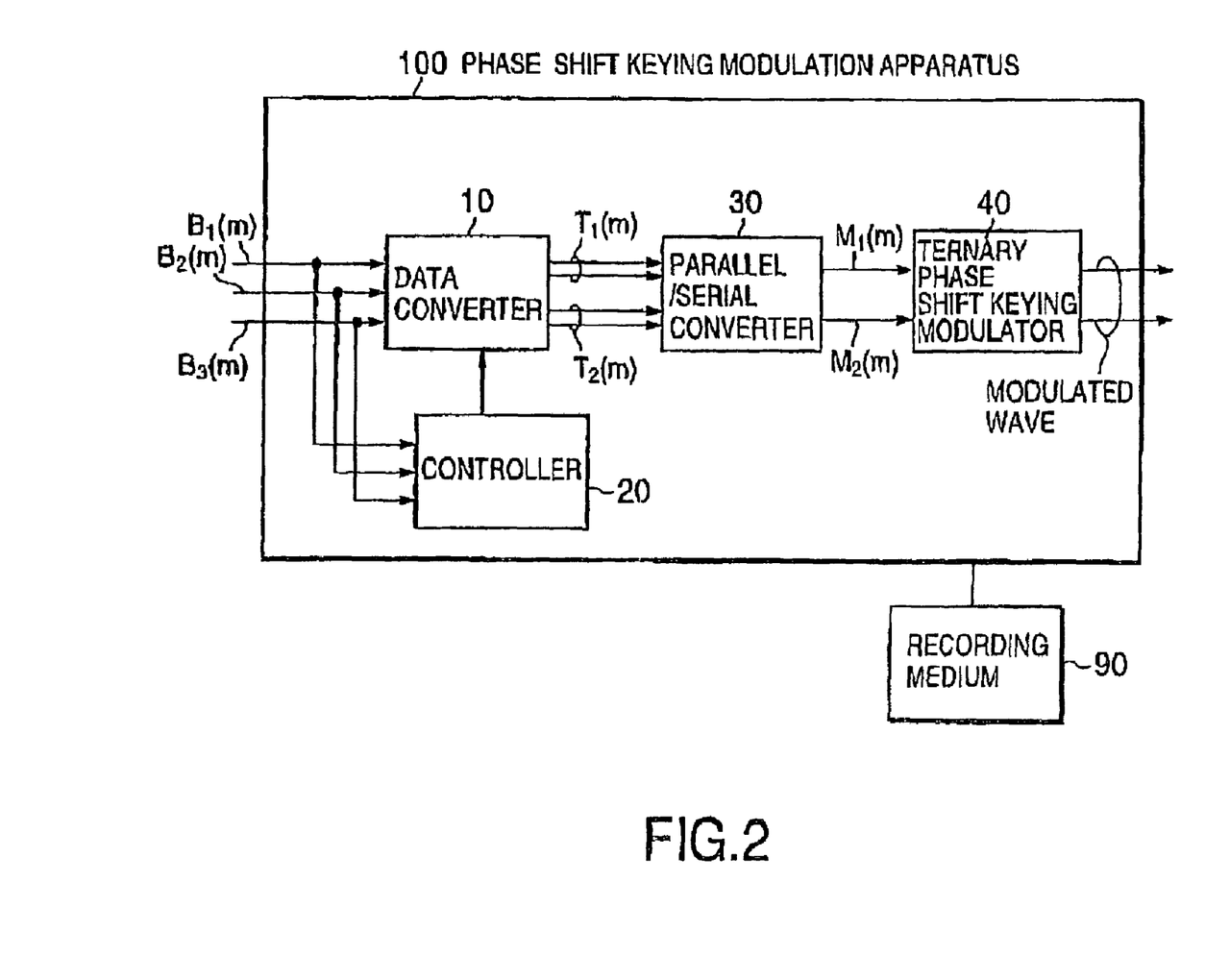
FIG. 2 is a block diagram showing a phase shift keying modulation apparatus according to a first embodiment of this invention.

Referring to FIG. 2, the description will proceed to a phase shift keying modulation apparatus 100 according to a first embodiment of this invention. The illustrated phase shift keying modulation apparatus 100 comprises a data converter 10, a controller 20, a parallel/serial converter 30, and a ternary phase shift keying modulator 40.

The data converter 10 is supplied with first through third input binary signals $B_1(m)$, $B_2(m)$, and $B_3(m)$ as an input signal. The data converter 20 converts the first through the third input binary signals $B_1(m)$–$B_3(m)$ into two ternary signals which are called first and second ternary converted data signals $T_1(m)$ and $T_2(m)$. The first through the third input binary signals $B_1(m)$–$B_3(m)$ are also supplied to the controller 20 which is connected to the data converter 10. The controller 20 controls conversion processing in the data converter 10.

Figure 3:
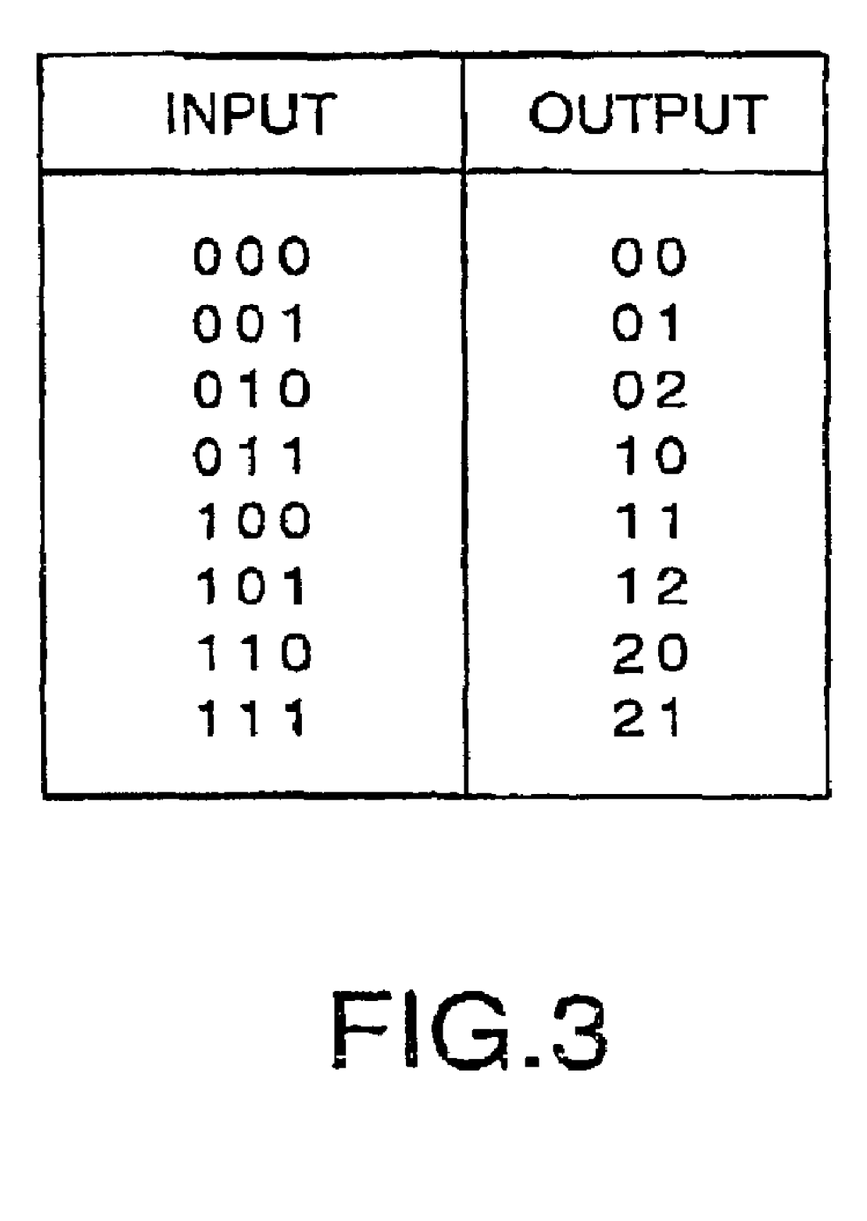
FIG. 3 shows an example of the data conversion from three input binary signals to two ternary signals.

Turning to FIG. 3, the description will proceed to data conversion in the data converter 10. FIG. 3 shows an example of the data conversion from the three input binary signals $B_1(m)$–$B_3(m)$ to the two ternary converted data signals $T_1(m)$ and $T_2(m)$. In FIG. 3, an "input" illustrates values "0" and "1" of the binary signal in each column such as 000, 001, ..., and 111 in line while an "output" illustrates values "0", "1", and "2" of the ternary signal in each column such as 00, 01, 02, 10, ..., and 21 in line. The controller 20 controls the data converter 10 as shown in the example in FIG. 3 to make the data converter 10 convert the three input binary signals.

The three binary signals $B_1(m)$–$B_3(m)$ indicate eight types of data of 000 to 111 while the two ternary converted data signals $T_1(m)$ and $T_2(m)$ indicate nine types of data of 00 to 22. Accordingly, as shown in the example of FIG. 3, it is possible to uniquely assign the three binary signals to the two ternary converted data signals.

In such as a uniquely assignment, an unassigned one of sets in the two ternary converted data signals $T_1(m)$ and $T_2(m)$ occurs. In the example being illustrated in FIG. 3, the input signal is not assigned to "22". Therefore, in the example of FIG. 3, the first ternary converted data signal $T_1(m)$ has one of "0", "1", and "2". The second ternary converted data signal $T_2(m)$ has one of "0", "1", and "2", when the first ternary converted data signal $T_1(m)$ has either "0" or "1". The second ternary converted data signal $T_2(m)$ has either "0" or "1" when the first ternary converted data signal $T_1(m)$ has "2".

Figure 4A:
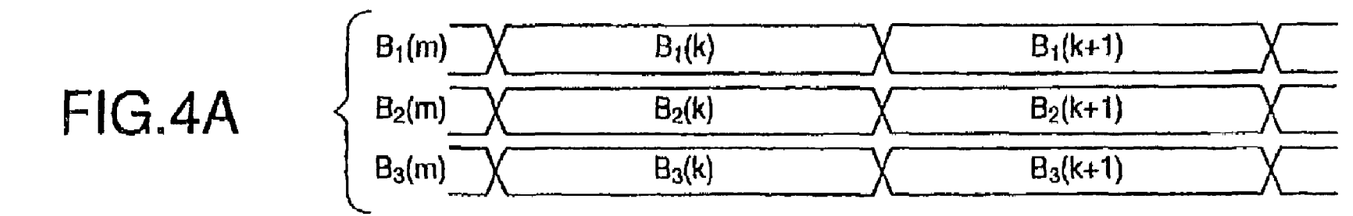
FIG. 4A shows first through third input binary signals supplied to a data converter for use in the phase shift keying modulation apparatus illustrated in FIG. 2.
Figures 4B, 4C:
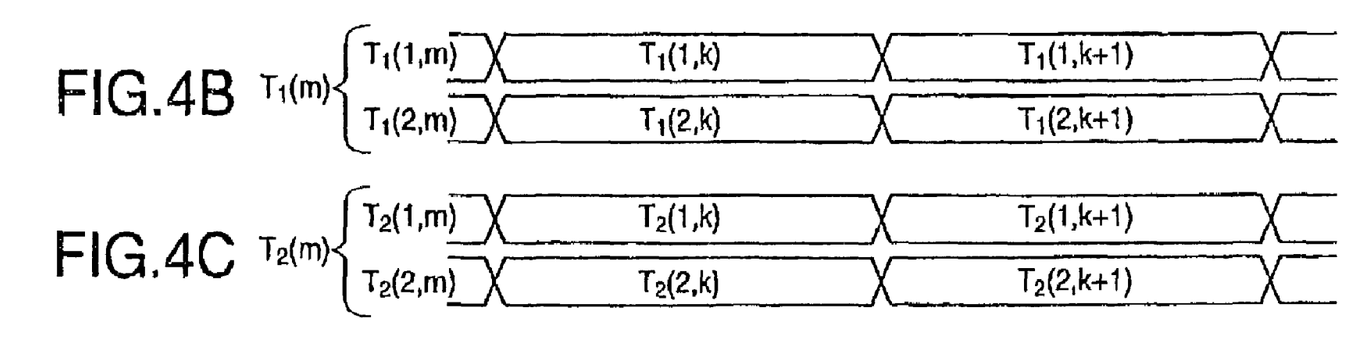
FIGS. 4B and 4C show first and second ternary converted data signals produced by the data converter, respectively.
Figure 4D:
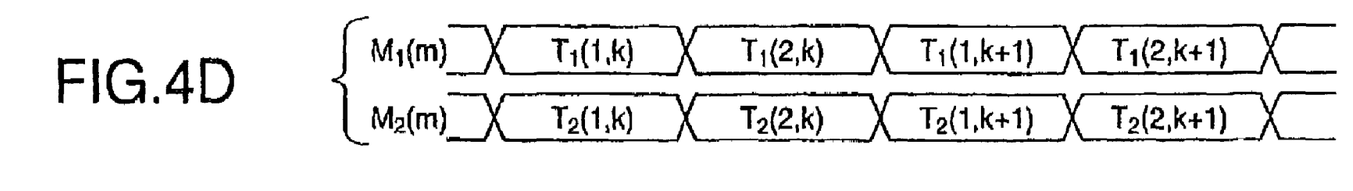
FIG. 4D shows first and second multiplexed data signals produced by a parallel/serial converter for use in the phase shift keying modulation apparatus illustrated in FIG. 2.

FIGS. 4A, 4B, 4C, and 4D show signal conversion in each part of the phase shift keying modulation apparatus 100. FIG. 4A shows the first through third input binary signals $B_1(m)$, $B_2(m)$, and $B_3(m)$ supplied to the data converter 10. FIGS. 4B and 4C show the first and the second ternary converted data signals $T_1(m)$ and $T_2(m)$ produced by the data converter 10, respectively. FIG. 4D shows first and second multiplexed data signals $M_1(m)$ and $M_2(m)$ produced by the parallel/serial converter 30.

As shown in FIG. 4A, the first input binary signal $B_1(m)$ comprises a series of bit elements such as $B_1(k)$, $B_1(k+1)$, and so on. The second input binary signal $B_2(m)$ comprises a series of bit elements such as $B_2(k)$, $B_2(k+1)$, and so on. The third input binary signal $B_3(m)$ comprises a series of bit elements such as $B_3(k)$, $B_3(k+1)$, and so on.

The first through the third input binary signals $B_1(m)$–$B_3(m)$ shown in FIG. 4A are converted by the data converter 10 into the first and the second ternary converted data signals $T_1(m)$ and $T_2(m)$ shown in FIGS. 4B and 4C. Each of the first and the second ternary converted data signals $T_1(m)$ and $T_2(m)$ has one value selected from "0", "1", and "2" using two parallel signals.

As shown in FIG. 4B, the first ternary converted data signal $T_1(m)$ consists of first and second primary binary converted data trains $T_1(1,m)$ and $T_1(2,m)$. The first primary binary converted data train $T_1(1,m)$ comprises a series of bit elements such as $T_1(1,k)$, $T_1(1,k+1)$, and so on. The second primary converted data train $T_13(2,m)$ comprises a series of bit elements such as $T_1(2,k)$, $T_1(2,k+1)$, and so on.

As shown in FIG. 4C, the second ternary converted data signal $T_2(m)$ consists of first and second subsidiary binary converted data trains $T_2(1,m)$, $T_2(2,m)$, and so on. The first subsidiary binary converted data train $T_2(1,m)$ comprises a series of bit elements such as $T_2(1,k)$, $T_2(1,k+1)$, and so on. The second subsidiary binary converted data train $T_2(2,m)$ comprises a series of bit elements such as $T_2(2,k)$, $T_2(2,k+1)$, and so on.

The parallel/serial converter 30 temporally multiplexes the first and the second ternary converted data signals $T_1(m)$ and $T_2(m)$ shown in FIGS. 4B and 4C into the first and the second multiplexed data signals $M_1(m)$ and $M_2(m)$ shown in FIG. 4D, respectively. Each of the first and the second multiplexed data signals $M_1(m)$ and $M_2(m)$ is produced as a serial signal, As shown in FIG. 4D, the first multiplexed data signal $M_1(m)$ comprises a series of bit elements such as $T_1(1,k)$ $T_1(2,k)$, $T_1(1,k+1)$, $T_1(2,k+1)$, and so on while the second multiplexed data signal $M_2(m)$ comprises a series of bit elements such as $T_2(1,k)$, $T_2(2,k)$, $T_2(1,k+1)$, $T_2(2,k+1)$, and so on.

The ternary phase shift keying modulator 40 is supplied with the first and the second multiplexed data signals $M_1(m)$ and $M_2(m)$ produced by the parallel/serial converter 30. The ternary phase shift keying modulator 40 modulates the phase of the carrier signal by the first and the second multiplexed data signals $M_1(m)$ and $M_2(m)$ to produce first and second ternary phase shift keying modulated signals, respectively. Each of the first and the second ternary phase shift keying modulated signals indicates one of three values of "0", "1", and "2" in synchronism with a clock signal.

Figure 5:
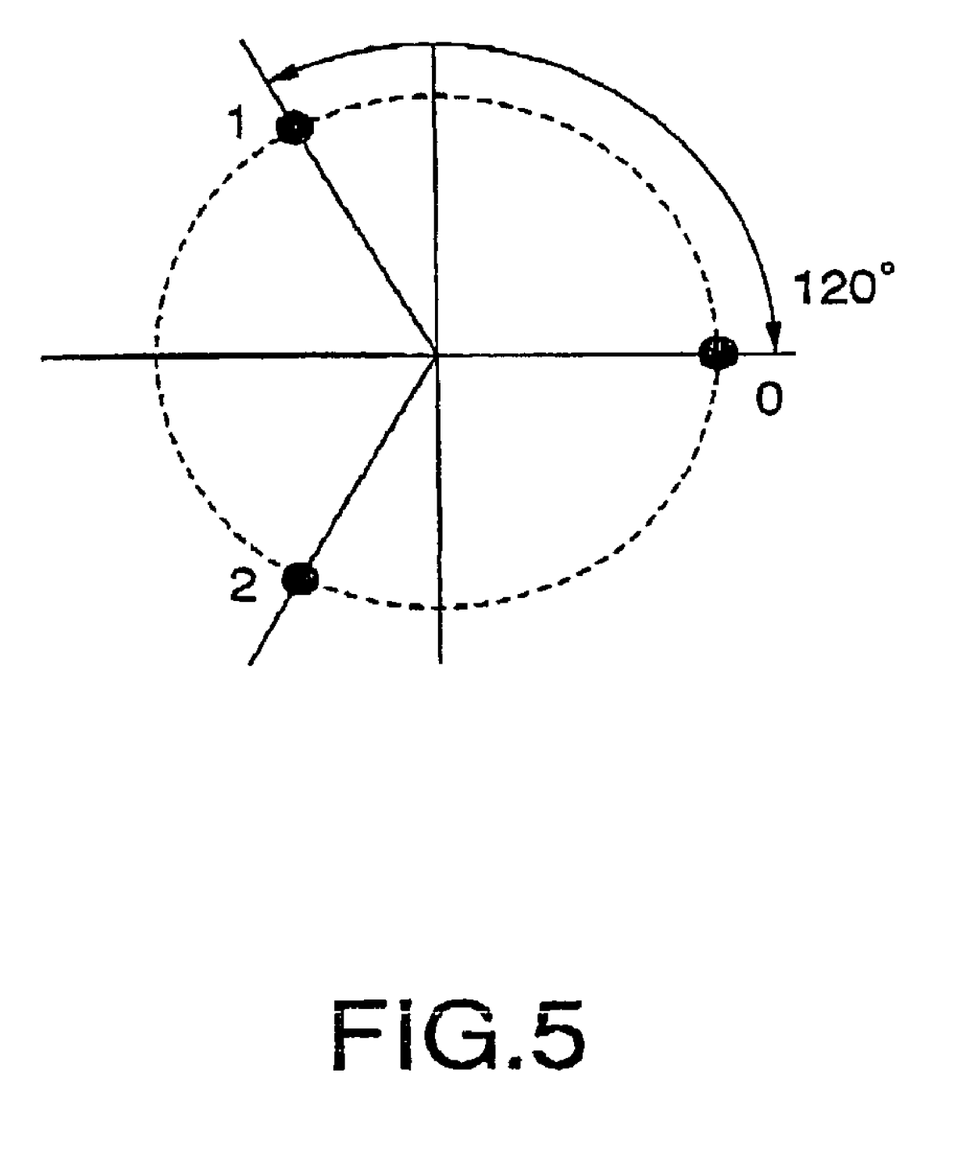
FIG. 5 shows a phase plane used in describing signal points of a ternary phase shift keying modulated signal produced by a ternary phase shift keying modulator for use in the phase shift keying modulation apparatus illustrated in FIG. 2.

Turning to FIG. 5, the description will proceed to the ternary phase shift keying modulated signal produced by the ternary phase shift keying modulator 40. The ternary phase shift keying modulator 40 assigns the values of "0", "1", and "2" in the multiplexed data signal to phases of 0 degree, 120 degrees, and 240 degrees in the ternary phase shift keying modulated signal.

In prior art, in a case of modulating the phase of the carrier signal by the n binary digital signals $D_1(m)$–$D_n(m)$ as illustrated in FIGS. 1A, 1B, and 1C, the phase conversion is carried out so that the n input binary digital signals $D_1(m)$–$D_n(m)$ correspond to signal points indicative of $2^n$ values. By using this invention in the manner which is described, it is possible to make phase points about $2^{(n+0.5)}$.

As a result, it is possible to provide a phase shift keying modulation method having a frequency available efficiency intermediate between 4PSK (QPSK: Quadrature Phase Shift Keying) and 2PSK (BPSK: Binary Phase Shift Keying) in a case where 4PSK has a margin for a frequency band too and 2PSK is not satisfied with a required frequency band.

Accordingly, the phase shift keying modulation apparatus 100 according to this invention can not only effectively use the frequency but also effectively use power. This is because it is possible to realize a digital phase modulation at a required signal-to-noise ratio less than that of 4PSK (QPSK).

Figure 6:
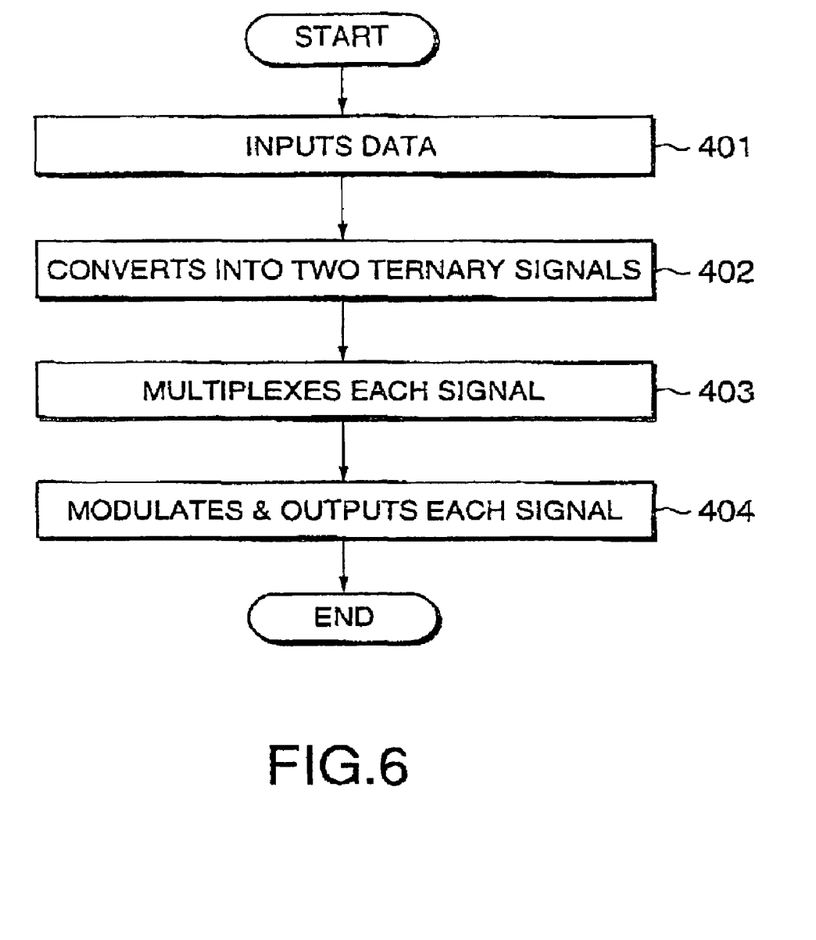
FIG. 6 is a flowchart for use in describing operation of the phase shift keying modulation apparatus illustrated in FIG. 2.

Referring to FIG. 6, the description will be made as regards operation of the phase shift keying modulation apparatus 100 illustrated in FIG. 2. FIG. 6 is a flowchart for use in describing operation of the phase shift keying modulation apparatus 100 illustrated in FIG. 2.

At first, an input data is received in the phase shift keying modulation apparatus 100 at a step 401. The input data is represented by the three input binary signals $B_1(m)$–$B_3(m)$ shown in FIG. 4A. Successive input data may be collectively taken for three bits.

The step 401 is succeeded by a step 402 at which the data converter 10 converts the three input binary signals $B_1(m)$–$B_3(m)$ shown in FIG. 4A into the first and the second ternary converted data signals $T_1(m)$ and $T_2(m)$ which are a set of two ternary signals shown in FIGS. 4B and 4C. After converted by the data converter 10, each ternary signal indicates ternary elements of "0", "1", and "2" using two binary signal lines in synchronism with the clock signal.

The step 402 proceeds to a step 403 at which the parallel/serial converter 30 temporally multiplexes the first and the second ternary converted data signals $T_1(m)$ and $T_2(m)$ shown in FIGS. 4B and 4C into the first and the second multiplexed data signals $M_1(m)$ and $M_2(m)$ shown in FIG. 4D. Each of the first and the second multiplexed data signals $M_1(m)$ and $M_2(m)$ is produced as a serial signal for one clock of the input signal. That is, each ternary signal as two parallel signals is temporally compressed to the multiplexed data signal as the serial signal by temporal multiplexing.

The step 403 is followed by a step 404 at which the ternary phase shift keying modulator 40 modulates the phase of the carrier signal by each ternary signal shown in FIG. 4D to produce a ternary phase shift keying modulated wave or a signal having three signal points.

Referring to FIG. 7 and FIGS. 8A, 8B, 8C, 8D, 8E, 8F, 8G, and 8H, the description will proceed to correspondence between the three input binary signals $B_1(m)$–$B_3(m)$ and two ternary phase shift keying modulated signals on the basis of correspondence of the example in FIG. 3.

Figure 7:
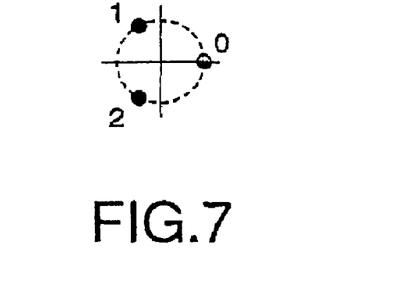
FIG. 7 shows a phase plane used in describing a transmission signal and a modulated symbol.

FIG. 7 shows a phase plane used in describing a transmission signal and a modulated symbol. In FIG. 7, the transmission signal is depicted at a black circle while the modulated symbol is depicted at a number of 0, 1, and 2.

FIGS. 8A to 8H show the correspondence between the three input binary signals $B_1(m)$–$B_3(m)$ and two ternary phase shift; keying modulated signals. The two ternary phase shift keying modulated signals are called first and second ternary phase shift keying modulated signals. In each of FIGS. 8A to 8H, a left-hand side shows a first phase plane used in describing a signal point of the first ternary phase shift keying modulate signal while a right-hand side shows a second phase plane used in describing a signal point of the second ternary phase shift keying modulated signal.

Figure 8A:
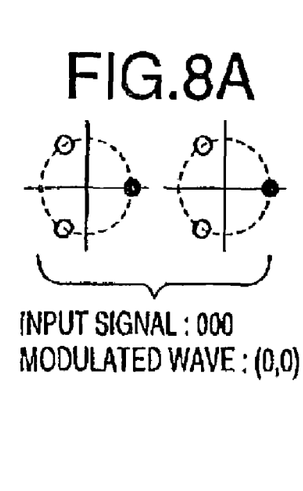
FIGS. 8A to 8H show correspondence between the three input binary signals and the two ternary phase shift keying modulated signals.
Figure 8B:
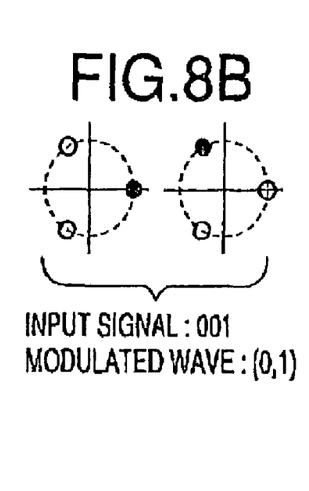
Figure 8C:
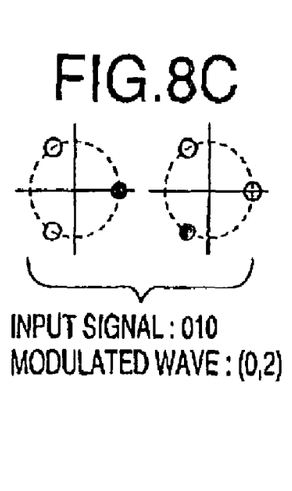
Figure 8D:
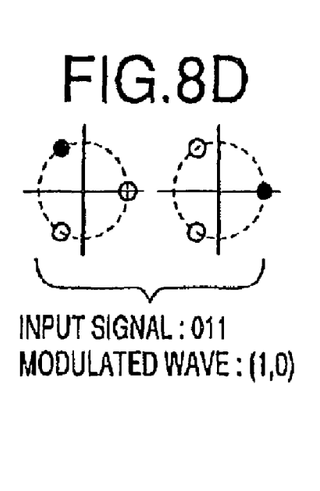
Figure 8E:
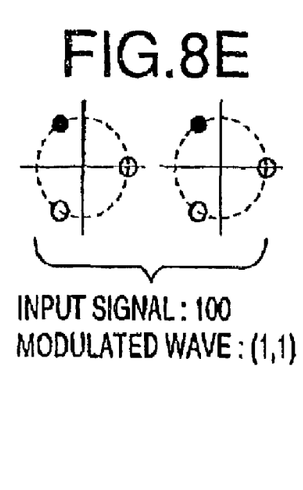
Figure 8F:
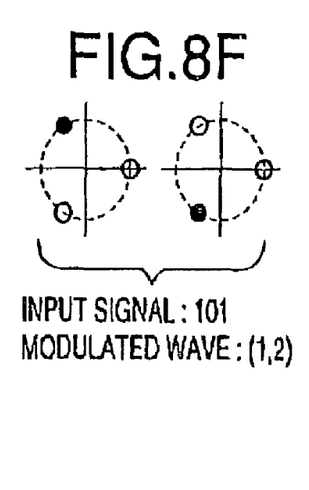
Figure 8G:
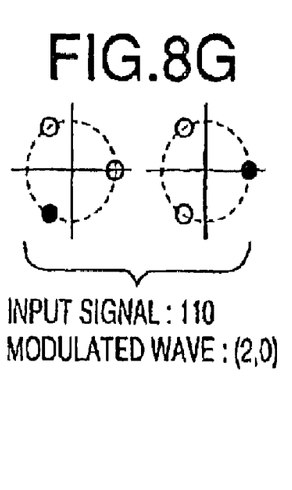
Figure 8H:
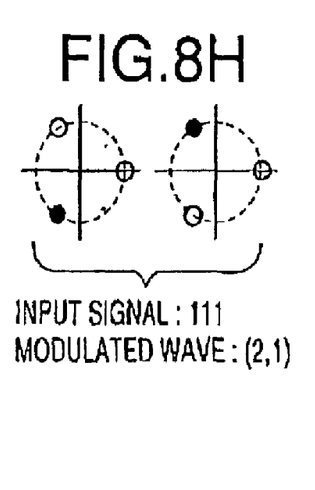

Specifically, FIG. 8A shows the correspondence between the three input binary signals $B_1(m)$–$B_3(m)$ having three binary values of 000 and the two ternary phase shift keying modulated signals having two ternary values of (0, 0). FIG. 8B shows the correspondence between the three input binary signals $B_1(m)$–$B_3(m)$ having three binary values of 001 and the two ternary phase shift keying modulated signals having two ternary values of (0, 1). FIG. 8C shows the correspondence between the three input binary signals $B_1(m)$–$B_3(m)$ having three binary values of 010 and the two ternary phase shift keying modulated signals having two ternary values of (0, 2). FIG. 8D shows the correspondence between the three input binary signals $B_1(m)$–$B_3(m)$ having three binary values of 011 and the two ternary phase shift keying modulated signals having two ternary values of (1, 0). FIG. 8E shows the correspondence between the three input binary signals $B_1(m)$–$B_3(m)$ having three binary values of 100 and the two ternary phase shift keying modulated signals having two ternary values of (1, 1). FIG. 8F shows the correspondence between the three input binary signals $B_1(m)$–$B_3(m)$ having three binary values of 101 and the two ternary phase shift keying modulated signals having two ternary values of (1, 2). FIG. 8G shows the correspondence between the three input binary signals $B_1(m)$–$B_3(m)$ having three binary values of 110 and the two ternary phase shift keying modulated signals having two ternary values of (2, 0). FIG. 8H shows the correspondence between the three input binary signals $B_1(m)$–$B_3(m)$ having three binary values of 111 and the two ternary phase shift keying modulated signals having two ternary values of (2, 1).

With regard to the three input binary signals $B_1(m)$–$B_3(m)$ shown in FIGS. 8A–8H, the first ternary converted data signal $T_1(m)$ for the two ternary phase shift keying modulated signals (modulated symbol) takes one of "0", "1", and "2". In this event, the second ternary converted data signal $T_2(m)$ takes one of "0", "1", and "2" when the first ternary converted data signal $T_1(m)$ has either "0" or "1". The second ternary converted data signal $T_2(m)$ takes either "0" or "1" when the first ternary converted data signal $T_1(m)$ has "2".

Types of all of the two ternary phase shift keying modulated signals are equal in number to "2×3+1×2" and are equal to the number of types "8" in the input signal. In a first term "2×3", the first half "2" indicates a case where the first ternary converted data signal $T_1(m)$ takes either "0" or "1" while the latter half "3" indicates a case there the second ternary converted data signal $T_2(m)$ takes one of "0", "1", and "2". In a second term "1×2", the first half "1" indicates a case where the first ternary converted data signal $T_1(m)$ takes "2" while the latter half "2" indicates a case where the second ternary converted data signal $T_2(m)$ takes either "0" or "1".

When the input signal ($B_1(m)$–$B_3(m)$) shifts from "000" to "111", the phase-shift-keying-modulated wave is produced in order shown in FIGS. 8A–8H. That is, on shifting the input signal from "000" to "111", the second ternary converted data signal $T_2(m)$ takes the values of "0", "1", and "2" when the first ternary converted data signal $T_1(m)$ has "0" or "1" while the second ternary converted data signal $T_2(m)$ takes the values of "0" and "1" when the first ternary converted data signal $T_1(m)$ has "2". As described above, the types of all of the two three-phase phase-modulated signals are equal in number to "2×3+1×2" and are equal to the number of types "8" in the input signal.

In the manner which is described above, according to the first embodiment of this invention, it is possible to effectively phase convert the three input binary signals $B_1(m)$–$B_3(m)$ into the two ternary phase shift keying modulated signals to produce it as two ternary signals $T_1(m)$ and $T_2(m)$.

Now, the description will proceed to other embodiments of this invention. First, the description will proceed to embodiments for improving unbalance in arrangement of signal points by using basic structure according to the first embodiment of this invention illustrated in FIG. 2.

Figure 9A:
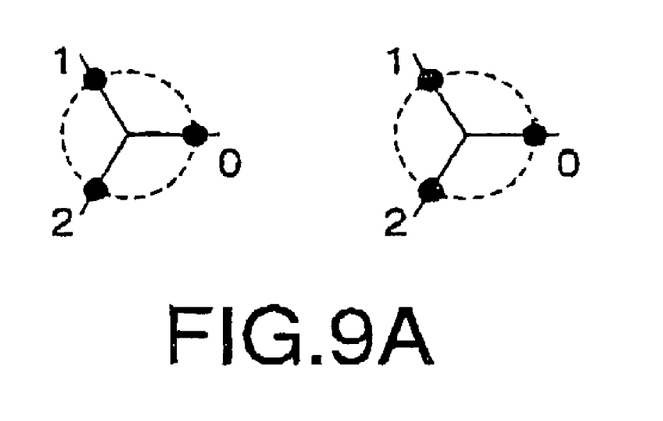
FIGS. 9A, 9B, and 9C are views showing various embodiments in arrangement of the signal points after converting.
Figure 9B:
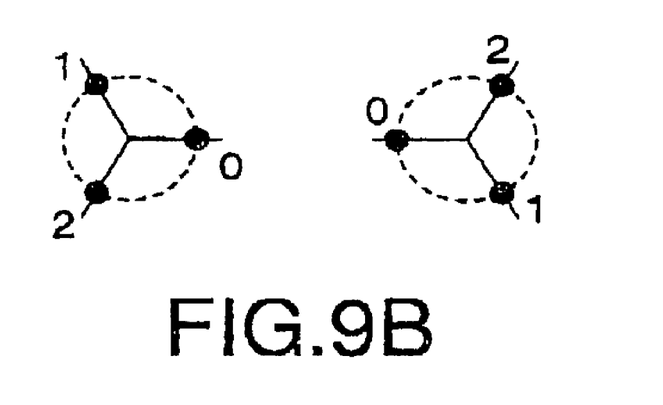
Figure 9C:
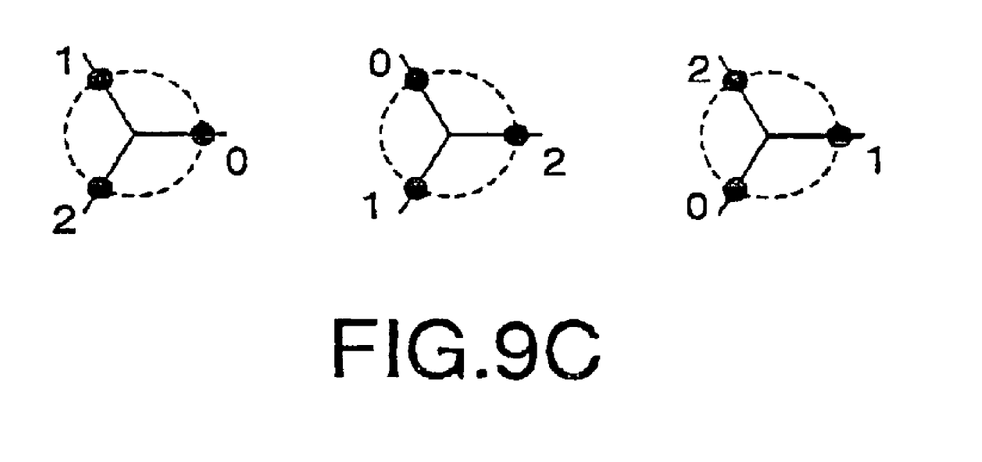

FIGS. 9A, 9B, and 9C are views showing various embodiments in arrangement of the signal points after converting.

FIG. 9A shows arrangement of the signal points according to the first embodiment of this invention. That is, according to the first embodiment of this invention, the ternary phase shift keying modulated signal is arranged on the phase plane at three points of 0 degree, 120 degrees, and 240 degrees and this arrangement is repeated. In this case, when the input signal illustrated in FIGS. 8A–8H shifts eight types of "000" to "111", each of "0" and "1" in three signal points occurs six times at total of the first and the second ternary converted data signals $T_1(m)$ and $T_2(m)$ while "2" in the three signal points occurs four times at total of the first and the second ternary converted data signals $T_1(m)$ and $T_2(m)$. Accordingly, when observation is made for a long time, occurrence probability is small regards to "2" of the signal point and it results in occurring a carrier in spite of phase modulation.

As a method for improving this, there is a method for arranging signals on a second phase plane rotation symmetrically about a first phase plane. In this event, rotation of 180 degrees is important without rotation of 60 degrees.

Except for a method of fixing arrangement of signals for phase points in the manner as the above-mentioned embodiments, a method of sequentially renewing the arrangement of signals for phase points every modulation timing. For example, in the manner as three types shown in FIG. 9C, it may adopt a method comprising the steps of rotating arrangement of a signal for a phase point in a predetermined direction by an angle of 120 degrees every modulation timing and of producing the first and the second ternary phase shift keying modulated signals. By adopting those methods, it is possible to resolve problem caused by the unbalance of occurrence probability in the signal points.

Although the phase shift keying modulation apparatus according to each of the above-mentioned embodiments realizes in hardware functions of the data converter 10, the controller 20, the parallel/serial converter 30, the ternary phase shift keying modulator 40, and other functions, it may be possible to realize the phase shift keying modulation apparatus by loading a phase shift keying modulation program acting as a computer program having respective functions in a memory of a computer processing apparatus. In this event, the phase shift keying modulation program is stored in a recording medium 90 such as a magnetic disk, a semiconductor memory, or the like. The above-mentioned functions are realized by loading the phase shift keying modulation program from the recording medium 90 to the computer processing apparatus to control operation of the computer processing apparatus.

While this invention has thus far been described in conjunction with a few preferred embodiments thereof, it will now be readily possible for those skilled in the art to put this invention into various other manners.

What is claimed is:

1. A phase shift keying modulation apparatus for modulating a phase of a carrier signal by an input signal to produce a phase-shift-keying-modulated wave, said phase shift keying modulation apparatus comprising:

a data converter, supplied with an input data signal having 3 bits long as said input signal, for converting said input data signal into first and second ternary converted data signals which are mapped on first and second phase planes, respectivley, said first ternary converted data signal having one of first through third values, said second ternary converted data signal having one of said first through said third values when said first ternary converted data signal has either said first value or said second value, said second ternary converted data signal having either said first value or said second value when said first ternary converted data signal has said third value; and a ternary phase shift keying modulator for modulating, in synchronism with a clock signal, the phase of said carrier signal by said first and said second ternary converted data signals to produce, as said phase-shift-keying modulated wave, first and second ternary phase shift keying modulated signals, respectively, said first ternary phase shift keying modulated signal on the first phase plane having one of first through third angles of the carrier signal that are predetermined in response to said first through said third values of said first ternary converted data signal, respectively, said second ternary phase shift keying modulated signal on the second phase plane having one of fourth through sixth angles of the carrier signal that are predetermined in response to said first through said third values of said second ternary converted data signal, respectively.

2. A phase shift keying modulation apparatus as claimed in claim 1, wherein said first value is equal to a value of "0", said second value is equal to a value of "1", and said third value is equal to a value of "2".

3. A phase shift keying modulation apparatus as claimed in claim 1, wherein said first through said third angles are different from one another by 120 degrees, said fourth through said sixth angles being different from one another by 120 degrees.

4. A phase shift keying modulation apparatus as claimed in claim 3, wherein said third and said sixth angles are equivalent to or different from each other by 180 degrees.

5. A phase shift keying modulation apparatus as claimed in claim 3, wherein said first and said fourth angles are different from each other by 180 degrees, said second and said fifth angles being different from each other by 180 degrees, and said third and said sixth angles being different from each other by 180 degrees.

6. A phase shift keying modulation apparatus as claimed in claim 3, wherein said first angle is equal to 0 degree, said second angle being equal to 120 degrees, and said third angle being equal to 240 degrees.

7. A phase shift keying modulation apparatus as claimed in claim 6, wherein said third and said sixth angles are equivalent to or different from each other by 180 degrees.

8. A phase shift keying modulation apparatus as claimed in claim 6, wherein said first and said fourth angles are different from each other by 180 degrees, said second and said fifth angles being different from each other by 180 degrees, and said third and said sixth angles being different from each other by 180 degrees.

9. A phase shift keying modulation apparatus as claimed in claim 3, wherein said ternary phase shift keying modulator produces said first and said second ternary phase shift keying modulated signals by renewing all angles of said first through said sixth angles into angles obtained by rotating said all angles in a predetermined direction by 120 degrees every modulation timing.

10. A phase shift keying modulation apparatus as claimed in claim 1, wherein said data converter produces said first and said second converted data signals each using two parallel signals.

11. A phase shift keying modulation apparatus as claimed in claim 1, wherein said data converter produces said first and said second ternary converted data signals each using two parallel signals, said phase shift keying modulation apparatus further comprising a parallel-serial converter, disposed between said data converter and said ternary phase shift keying modulator, for temporally multiplexing said first and said second ternary converted data signals into first and second multiplexed signals, respectively, said parallel-serial converter supplying said ternary phase shift keying modulator with said first and said second multiplexed signals each using a serial signal.

12. A method of modulating a phase of a carrier signal by an input signal to produce a phase-shift-keying-modulated wave, said method comprising the steps of:
converting an input data signal having 3 bits long as said input signal into first and second ternary converted data signals which are mapped on first and second phase planes, respectively, said first ternary converted data signal having one of first through third values, said second ternary converted data signal having one of said first through said third values when said first ternary converted data signal has either said first value or said second value,.said second ternary converted data signal having either said first value or said second value when said first ternary converted data signal has said third value; and
modulating, in synchronism with a clock signal, the phase of said carrier signal by said first and said second ternary converted data signals to produce, as said phase-shift-keying-modulated wave, first and second ternary phase shift keying modulated signals, respectively, said first ternary phase shift keying modulated signal on the first phase plane having one of first through third angles of the carrier signal that are predetermined in response to said first through said third values of said first ternary converted data signal, respectively, said second ternary phase shift keying modulated signal on the second phase plane having one of fourth through sixth angles of the carrier signal that are predetermined in response to said first through said third values of said second ternary converted data signal, respectively.

13. A method as claimed in claim 12, wherein said first value is equal to a value of "0", said second value is equal to a value of "1", and said third value is equal to a value of "2".

14. A method as claimed in claim 12, wherein said first through said third angles are different from one another by 120 degrees, said fourth through said sixth angles being different from one another by 120 degrees.

15. A method as claimed in claim 14, wherein said third and said sixth angles are equivalent to or different from each other by 180 degrees.

16. A method as claimed in claim 14, wherein said first and said fourth angles are different from each other by 180 degrees, said second and said fifth angles being different from each other by 180 degrees, and said third and said sixth angles being different from each other by 180 degrees.

17. A method as claimed in claim 14, wherein said first angle is equal to 0 degree, said second angle being equal to 120 degrees, and said third angle being equal to 240 degrees.

18. A method as claimed in claim 17, wherein said third and said sixth angles are equivalent to or different from each other by 180 degrees.

19. A method as claimed in claim 17, wherein said first and said fourth angles are different from each other by 180 degrees, said second and said fifth angles being different from each other by 180 degrees, and said third and said sixth angles being different from each other by 180 degrees.

20. A method as claimed in claim 14, wherein said modulating step produces said first and said second ternary phase shift keying modulated signals by renewing all angles of said first through said sixth angles into angles obtained by rotating said all angles in a predetermined direction by 120 degrees every modulation timing.

21. A method as claimed in claim 12, wherein said converting step produces said first and said second converted data signals each using two parallel signals.

22. A method as claimed in claim 12, said converting step producing said first and said second ternary converted data signals each using two parallel signals, wherein said method further comprising the step of temporally multiplexing said first and said second ternary converted data signals into first and second multiplexed signals, respectively, to supply said modulating step with said first and said second multiplexed signals each using a serial signal.

23. A program for making a computer execute modulation of a phase of a carrier signal by an input signal to produce a phase-shift-keying-modulated wave, said program making the computer:
convert an input data signal having 3 bits long as said input signal into first and second ternary converted data signals which are mapped on first and second phase planes, respectively, said first ternary converted data signal having one of first through third values, said second ternary converted data signal having one of said first through said third values when said first ternary converted data signal has either said first value or said second value, said second ternary converted data signal having either said first value or said second value when said first ternary converted data signal has said third value; and
modulate, in synchronism with a clock signal, the phase of said carrier signal by said first and said second ternary converted data signals to produce, as said phase-shift-keying-modulated wave, first and second ternary phase shift keying modulated signals, respectively, said first ternary phase shift keying modulated signal on the first phase plane having one of first through third angles of the carrier signal that are predetermined in response to said first through said third values of said first ternary converted data signal, respectively, said second ternary phase shift keying modulated signal on the second phase plane having one of fourth through sixth angles of the carrier signal that are predetermined in response to said first through said third values of said second ternary converted data signal, respectively.

24. A program as claimed in claim 23, wherein said first value is equal to a value of "0", said second value is equal to a value of "1", and said third value is equal to a value of "2".

25. A program as claimed in claim 23, wherein said first through said third angles are different from one another by 120 degrees, said fourth through said sixth angles being different from one another by 120 degrees.

26. A program as claimed in claim 25, wherein said third and said sixth angles are equivalent to or different from each other by 180 degrees.

27. A program as claimed in claim 25, wherein said first and said fourth angles are different from each other by 180 degrees, said second and said fifth angles being different from each other by 180 degrees, and said third and said sixth angles being different from each other by 180 degrees.

28. A program as claimed in claim 25, wherein said first angle is equal to 0 degree, said second angle being equal to 120 degrees, and said third angle being equal to 240 degrees.

29. A program as claimed in claim 28, wherein said third and said sixth angles are equivalent to or different from each other by 180 degrees.

30. A program as claimed in claim 28, wherein said first and said fourth angles are different from each other by 180 degrees, said second and said fifth angles being different from each other by 180 degrees, and said third and said sixth angles being different from each other by 180 degrees.

31. A program as claimed in claim 25, wherein said modulating execution produces said first and said second ternary phase shift keying modulated signals by renewing all angles of said first through said sixth angles into angles obtained by rotating said all angles in a predetermined direction by 120 degrees every modulation timing.

32. A program as claimed in claim 23, wherein said converting execution produces said first and said second converted data signals each using two parallel signals.

33. A program as claimed in claim 23, said converting execution producing said first and said second ternary converted data signals each using two parallel signals, wherein said program further makes the computer temporally multiplex said first and said second ternary converted data signals into first and second multiplexed signals, respectively, to supply said modulating execution with said first and said second multiplexed signals each using a serial signal.

* * * * *